(12) United States Patent
Boys et al.

(10) Patent No.: US 10,666,090 B2
(45) Date of Patent: May 26, 2020

(54) INDUCTIVELY CONTROLLED SERIES RESONANT AC POWER TRANSFER

(71) Applicant: AUCKLAND UNISERVICES LIMITED, Auckland (NZ)

(72) Inventors: John Talbot Boys, Auckland (NZ); Grant Anthony Covic, Auckland (NZ); Hunter Hanzhuo Wu, Auckland (NZ)

(73) Assignee: AUCKLAND UNISERVICES LIMITED, Auckland (NZ)

(*) Notice: Subject to any disclaimer, the term of this patent is extended or adjusted under 35 U.S.C. 154(b) by 61 days.

(21) Appl. No.: 15/946,539

(22) Filed: Apr. 5, 2018

(65) Prior Publication Data

US 2019/0006883 A1     Jan. 3, 2019

Related U.S. Application Data

(63) Continuation of application No. 14/948,702, filed on Nov. 23, 2015, now abandoned, which is a continuation of application No. 13/261,259, filed as application No. PCT/NZ2010/000203 on Oct. 12, 2010, now abandoned.

(30) Foreign Application Priority Data

Oct. 12, 2009   (NZ) ......................... 580388

(51) Int. Cl.
    *H02J 50/12*       (2016.01)
(52) U.S. Cl.
    CPC .................. *H02J 50/12* (2016.02)

(58) Field of Classification Search
    CPC .................. H02J 50/12; H02J 5/005
    See application file for complete search history.

(56) References Cited

U.S. PATENT DOCUMENTS

| 5,293,308 | A | 3/1994 | Boys et al. | |
|---|---|---|---|---|
| 5,701,121 | A | 12/1997 | Murdoch | |
| 6,621,183 | B1* | 9/2003 | Boys ....................... | H02J 5/005 307/145 |
| 2007/0109708 | A1* | 5/2007 | Hussman .................. | H02J 1/00 361/113 |
| 2011/0101790 | A1* | 5/2011 | Budgett .................. | H02J 5/005 307/104 |

(Continued)

OTHER PUBLICATIONS

James J. Et Al: "A Variable Inductor Based Tuning Method for ICPT Pickups", Faculty of Engineering Papers, The University of Auckland, 2005, pp. 1-6 (not numerated).

(Continued)

*Primary Examiner* — Jared Fureman
*Assistant Examiner* — Duc M Pham
(74) *Attorney, Agent, or Firm* — Edell, Shapiro & Finnan, LLC

(57) ABSTRACT

An inductive power transfer pickup circuit has a pickup coil ($L_2$) and tuning capacitor ($C_2$) connected in series to provide a series resonant circuit. A bi-directional switch ($S_1$) is used to vary the phase angle between the open circuit pickup coil voltage ($V_{OC}$) and the pickup coil inductor current ($i_L$) to provide a controlled AC supply to an output of the pickup.

22 Claims, 8 Drawing Sheets

(56) References Cited

U.S. PATENT DOCUMENTS

2011/0221277 A1* 9/2011 Boys ............... H02J 5/005
                                                   307/104
2012/0217111 A1* 8/2012 Boys ............... H01F 38/14
                                                    191/10

OTHER PUBLICATIONS

Hu, A. P. Et Al: "A New High Frequency Current Generation Method for Inductive Power Transfer Applications", 37$^{th}$ IEEE Power Electronics Specialist Conference 2006, PESC ' 06, Jun. 18-22, 2006, p. 1-6.
International Preliminary Report on Patentability of International Application No. PCT/NZ2010/000203.

* cited by examiner

INDUCTIVELY CONTROLLED SERIES RESONANT AC POWER TRANSFER

The present application is based on and claims the benefit of U.S. patent application Ser. No. 14/948,702 filed on Nov. 23, 2015 which is based on U.S. patent application Ser. No. 13/261,259 filed on Jul. 30, 2012, which is a Section 371 application based on International Application Number PCT/NZ2010/000203 filed on Oct. 12, 2010, which claims priority from New Zealand Application Serial No. 580388 filed Oct. 12, 2009 and the entire contents of each of which are herein incorporated by reference.

FIELD OF THE INVENTION

This invention relates to Inductive Power Transfer (IPT) and has particular, but not sole, application to the provision of an AC power source. The invention may also be used to provide a DC power source.

BACKGROUND

IPT systems are now widely used in industry and elsewhere to couple power from one reference frame to another without physical contact. An example of such a system is described in specification U.S. Pat. No. 5,293,308, the contents of which are incorporated herein by reference.

IPT technology allows large amounts of electrical energy to be transferred between two loosely coupled inductors over relatively large air gaps. An IPT system can be divided into two sections—a primary supply and one or multiple secondary pickups. The, or each, pickup receives power inductively from the primary. For an IPT system used in material handling applications, multiple secondary pickups are coupled on one long track as shown in FIG. 1, and the coupling coefficient between the primary and secondary inductors is typically around 0.01-0.1. In order to transfer large amounts of power (>1 kW) to each secondary, the primary supply generates a current in the range of 10-80 A and a frequency in the order of 10-40 kHz to overcome the low coupling conditions. Currently, IPT applications have been used in a wide variety of industrial and commercial applications.

In order to improve power transfer capacity in the IPT system, some compensation or tuning capacitor is required in the secondary pickup. The two most common compensation topologies used in the pickup are parallel and series tuned systems as shown in FIG. 1. Parallel tuning gives a constant current source property and series tuning gives a constant voltage source property. For the series tuned pickup, the voltage source property is ideal for driving most common types of loads. However, it is difficult to exactly match the induced voltage of the pickup to the desired output voltage as the tolerance in the inductor windings can easily create a 10% deviation in the output voltage. This 10% error may not be acceptable for many commercial or industrial loads. As such, a switch mode controller is usually required after the pickup to regulate the output voltage to its desired value with a minimal amount of error.

One technique is to use primary side control to achieve voltage regulation on the secondary pickup. This method sends feedback signals such as output voltage of the secondary pickup back to the primary converter via a wireless communication channel. Generally, primary side control has two possible methods of realization—frequency control or primary current control.

For applications such as material handling systems with multiple secondary pickups, control on the primary side cannot be used since regulating voltage on one pickup will affect the operation of other pickups which may be operating at different power levels. One conventional method to regulate the output voltage on the secondary side is to use a linear voltage regulator after the pickup. However, due to the tolerance of the output voltage of the pickup and the poor efficiency of the linear regulator, this topology is limited to low power applications. Another method cascades a buck converter after the series tuned pickup to regulate the output voltage with more electrical efficiency. However, this is not ideal because of the large number of components required which increase cost. In addition, the two stage (AC-DC and DC-DC) conversion process has losses in each stage which reduce efficiency. Other secondary side control techniques directly regulate power on the AC side to deliberately tune or detune the resonant tank circuit by adding extra reactance. One technique to realize a variable reactance component is to use a magnetic amplifier to produce a variable inductor. Although this may vary the AC power directly, the use of a variable inductor in the non-linear region of the B-H curve can limit the efficiency of the overall system. In addition, the variable inductor is expensive to manufacture because it has to manage the high resonant current without fully saturating.

OBJECT

It is an object of the invention to provide an IPT system that provides an AC power source, or to at least provide the public with a useful choice.

SUMMARY OF THE INVENTION

In one aspect the disclosed subject matter provides a method of providing a power supply from IPT pickup having a pickup coil and tuning capacitor connected in series to provide a series resonant circuit, the method including the step of varying the phase angle between the open circuit pickup coil voltage and the pickup coil inductor current to provide a controlled AC supply to an output of the pickup.

In one embodiment the AC supply at the output is rectified to provide a DC supply at a further output.

In one embodiment the phase between the pickup coil open circuit voltage and the pickup coil inductor current is varied by substantially preventing current flow in the resonant circuit for a selected time period.

In one embodiment the selected time period is varied to vary the phase angle.

In one embodiment the step of substantially preventing current flow includes detecting when the current in the resonant circuit is substantially zero and maintaining the current at substantially zero for the selected time period.

In one embodiment the current is substantially prevented from flowing by operating a switch. In one embodiment the switch comprises a bidirectional switch.

In one embodiment the method includes the step of comparing the output of the pickup with a reference, and increasing or decreasing the selected time period to change the output of the pickup toward the reference.

In another aspect the disclosed subject matter provides a controller for an IPT pickup having a pickup coil and a tuning capacitor connected in series, the controller including one or more switches to control the pickup coil inductor current to thereby vary a phase angle between the pickup coil open circuit voltage and the pickup coil inductor current.

In one embodiment the phase between the pickup coil open circuit voltage and the pickup coil inductor current is varied by operating the one or more switches at a selected time to substantially prevent current flow in the resonant circuit for a selected time period.

In another aspect the disclosed subject matter provides an IPT pickup comprising a pickup coil and a tuning capacitor connected in series to provide a series resonant circuit, and a controller to vary a phase angle between the pickup coil open circuit voltage and the pickup coil inductor current to thereby provide a controlled AC supply to an output of the pickup.

In one embodiment the phase between the pickup coil open circuit voltage and the pickup coil inductor current is varied by the controller substantially preventing current flow in the resonant circuit for a selected time period.

In another aspect the disclosed subject matter provides an IPT pickup comprising a pickup coil and a tuning capacitor connected in series to provide a series resonant circuit, and a switch connected in series with the resonant circuit, the switch being operable to vary a phase angle between the pickup coil open circuit voltage and the pickup coil inductor current to thereby provide a controlled AC supply to an output of the pickup.

In one embodiment the switch comprises a bi-directional switch. A controller may be provided to control operation of the switch.

In yet another aspect the disclosed subject matter provides an IPT system including an IPT pickup according to any one of the preceding statements.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

BRIEF DRAWING DESCRIPTION

An embodiment of the invention will be described by way of example with reference to FIGS. 1-16 in which.

DESCRIPTION OF AN EMBODIMENT OF THE INVENTION

A new type of AC processing pickup illustrated herein exhibits excellent features such as simple circuitry, lower production cost and very high efficiency operation.

This specification discloses a new series AC processing pickup that uses an AC switch operating near ideal soft switching operating conditions to regulate the output voltage of the pickup directly. The output can be either controlled AC or DC depending on whether a rectifier is added to the AC output at the end of the resonant network.

Figure 1:
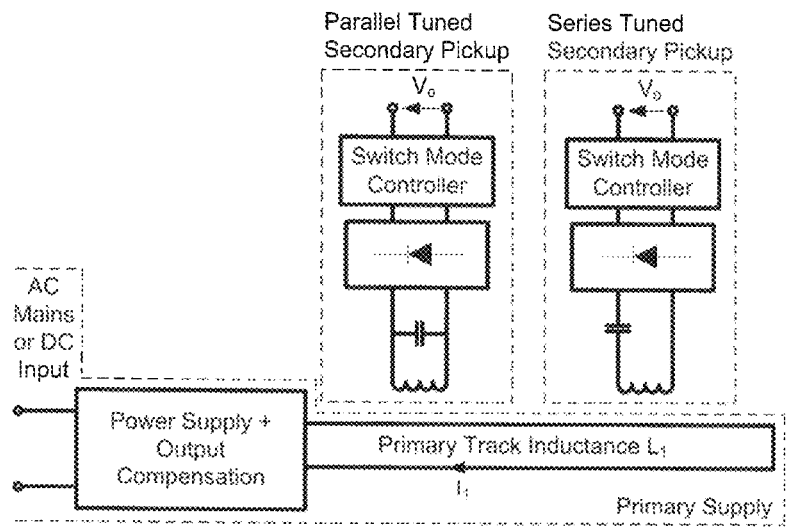
FIG. 1 is a block diagram of a known IPT system.
Figure 2:
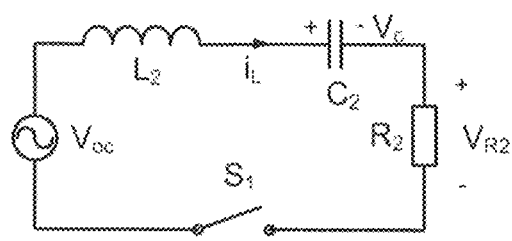
FIG. 2 is a diagram showing a Series Tuned AC Processing Pickup.

According to one embodiment of the invention a series AC processing pickup is shown in FIG. 2 with an AC output voltage ($V_{R2}$). Capacitor $C_2$ is tuned to inductor $L_2$ at the frequency of the primary track current $i_1$ to form a series resonant tank. The open circuit voltage source ($V_{oc}$) represents the induced voltage of the pickup. For simplicity, switch $S_1$ is drawn as an ideal AC switch and it is the basis for controlling the output voltage.

Figure 3:
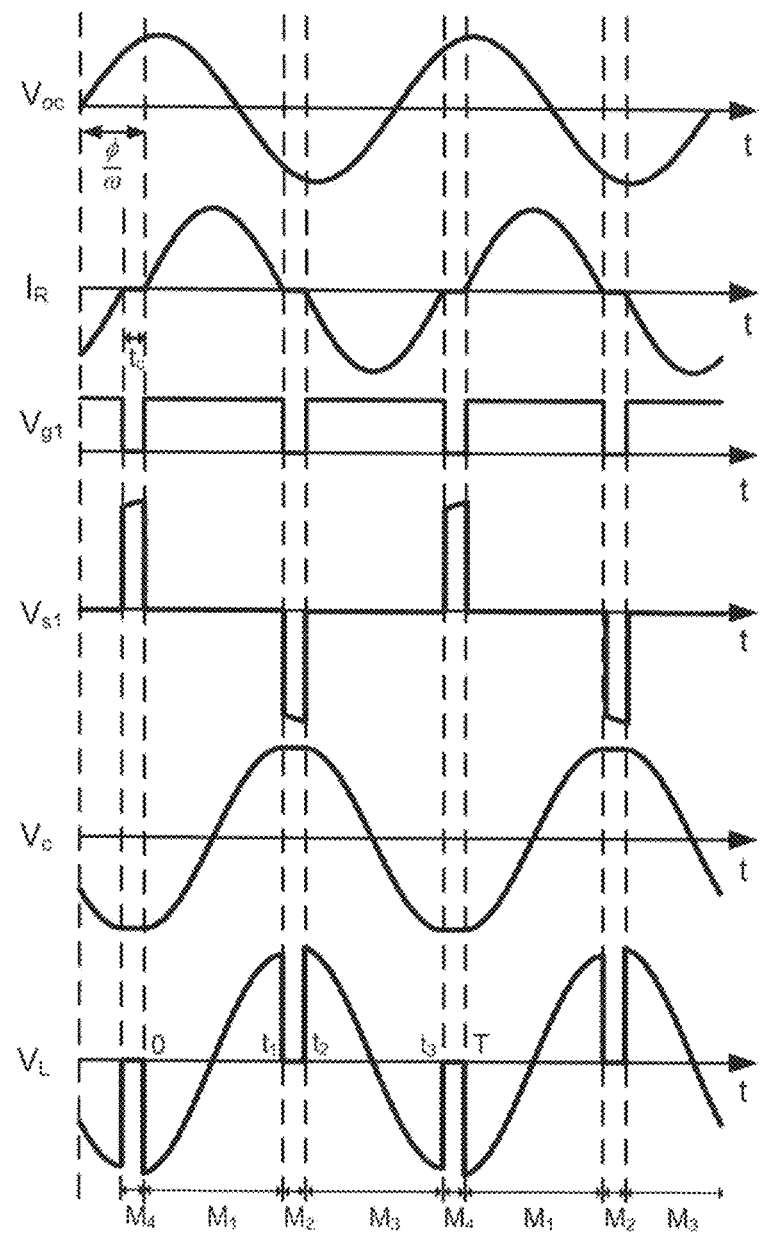
FIG. 3 shows operating waveforms of the series AC processing pickup of FIG. 2.

To illustrate the circuit's operation, FIG. 3 shows the one period operation of the series AC processing pickup at each particular switching interval. $V_{g1}$ is the PWM control signal which turns $S_1$ on and off. Consider the situation where $V_{g1}$ is controlled with a phase delay $\phi$ relative to the phase of $V_{oc}$ as shown in FIG. 3. In Mode 1 ($M_1$, 0<t≤$t_1$), $S_1$ is operated by being turned on and the capacitor $C_2$ resonates with pickup inductance $L_2$ like a series resonant tank and the inductor current reaches a peak value and returns back to zero. When the inductor current reaches zero, $S_1$ is operated by being turned off and the circuit enters Mode 2 ($M_2$, $t_1$<t≤$t_2$). In this mode, no current flows through any device and the inductor current is discontinuous, i.e. substantially zero for a selected time period, for a phase known as the discontinuous phase ($t_c/\omega$) at the point where $I_R$ (the current through the resistor $R_2$) changes from a positive to a negative voltage. In the beginning of Mode 3 ($M_3$, $t_2$<t≤$t_3$), $S_1$ is turned back on. Similar to $M_1$, the circuit operates like a series resonant tank and current flows into the load resistor. In Mode 4 ($M_4$, $t_3$<t≤T), similar to $M_2$, the resonant cycle is terminated and the inductor current is discontinuous. After this mode, the circuit returns back to $M_1$, repeating the switching process. In summary, the switching action from the equivalent AC switch generates a phase shift between the open circuit voltage and the inductor current waveform.

The series AC processing pickup also achieves near ideal soft switching conditions. From FIG. 3, at $t_1$, the voltage across $S_1$ decreases from zero to a negative voltage while the current through it is at zero. Because there is no current flow, Zero-Current-Switching (ZCS) is achieved at turn off. When $S_1$ is turned on at $t_2$, the pickup inductor in series with $S_1$ forces the current through it to increase slowly in the negative direction while the voltage across it decreases to zero. For most practical switches, the turn on is much faster than the rate of increase of the inductor current, so the di/dt through the switch is relatively small and a near zero current switch on condition is obtained. In summary, if the timing of the gate drive signal for the AC switch is accurate, the AC processing pickup achieves near perfect soft switching conditions. A more practical method of driving the AC switch which does not heavily rely on accurate timing is described further below. The soft switching condition gives the pickup desirable characteristics such as low switching losses, low switching stress and reduced electromagnetic interference (EMI) levels.

Analysis

From the previous section, it can be seen that the phase shift between $V_{oc}$ and $I_L$ can be controlled by adjusting the phase delay $\phi$. In this section, the phase delay $\phi$ is used in an exact analysis in the time domain to determine the characteristics of the circuit under steady state operation. The basis of the analysis method is that the conditions existing in the circuit at the end of a particular switching period must be the initial conditions for the start of the next switching period, and these conditions must be identical, allowing for steady state resonant operation.

The analysis procedure is greatly simplified based on the three following assumptions:

The Equivalent Series Resistance (ESR) of both capacitor $C_2$ and Inductor $L_2$ are very small compared to the load resistor and can be neglected.

The switching action of the transistors and diodes are instantaneous and lossless.

Capacitor $C_2$ and inductor $L_2$ are perfectly tuned forming a series resonant tank with the load.

Assuming the resonant tank is perfectly tuned, $$C_2 = 1/(\omega^2 L_2) \tag{1}$$

Figure 4:
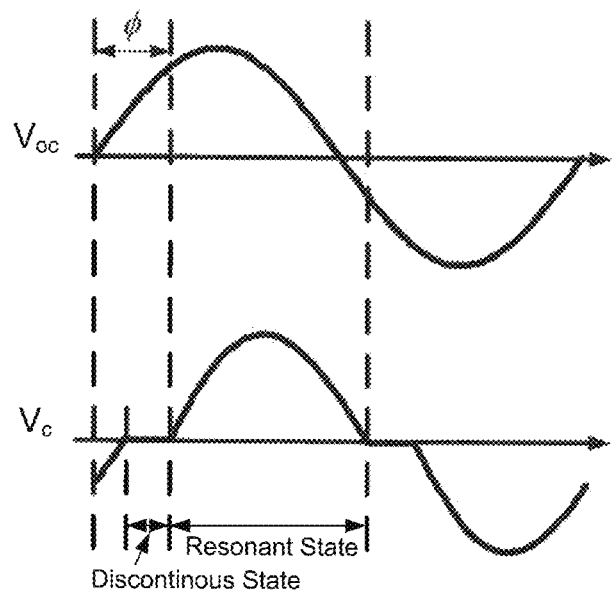
FIG. 4 is a diagram of the pickup circuit waveform showing two operating states.

With reference to FIG. 4, the waveform can be separated into two operating states known as the resonant state and the discontinuous state.

A. Resonant State

During the resonant state, the inductor current may be described as:

$$\frac{d^2 i_{Lr}}{dt^2} + \frac{R}{L_2}\frac{di_{Lr}}{dt} + \frac{i_{Lr}}{L_2 C_2} = \frac{V_{oc}\omega}{L_2}\cos(\omega t + \phi) \tag{2}$$

Considering the initial condition $i_{Lr}(t)|_{t=0}=0$ and $$\left.\frac{di_{Lr}(t)}{dt}\right|_{t=0} = \frac{V_{oc}\sin(\phi) - V_c(0)}{L_2},$$

the complete solution of the above equation is:

$$i_{Lr}(t) = \frac{-Q_2 V_{oc}\sin(\phi)}{\omega L_2 \sin(\theta_v)} e^{-t/T} \sin(\omega_f t - \theta_i) + \frac{Q_2 V_{oc}}{\omega L_2}\sin(\omega t + \phi) \tag{3}$$

where $$Q_2 = (\omega L_2)/R_2 \tag{4}$$

$$T = 2L_2/R_2 \tag{5}$$

$$\omega_f = \omega\sqrt{1 - 1/(4Q_2^2)} \tag{6}$$

$$\theta_i = \tan^{-1}\left(\frac{-\omega_f V_{oc}\sin(\phi)/\omega}{V_c(0) - V_{oc}\sin(\phi) + Q_2 V_{oc}\cos(\phi) + Q_2 V_{oc}\sin(\phi)/(\omega L_2)}\right) \tag{7}$$

In a similar way, considering the initial condition $$V_{cr}(t)|_{t=0} = V_c(0) \text{ and } \left.\frac{dV_{cr}(t)}{dt}\right|_{t=0} = 0,$$

the complete solution to the capacitor voltage is:

$$V_{cr}(t) = -\frac{V_c(0) + Q_2 V_{oc}\cos(\phi)}{\sin(\theta_v)} e^{-t/T}\sin(\omega_f t - \theta_v) - Q_2 V_{oc}\cos(\omega t + \phi) \tag{8}$$

where $$\theta_v = \tan^{-1}\left(\frac{\omega_f T(V_c(0) + Q_2 V_{oc}\cos(\phi))}{-V_c(0) - Q_2 V_{oc}\cos(\phi) + \omega T Q_2 V_{oc}\sin(\phi)}\right) \tag{9}$$

To investigate how long the circuit stays in the resonant state, $i_L(t)=0$ can be substituted in (3), resulting in the following expression:

$$i_{Lr}(t_z) = 0 \tag{10}$$

where $t_z$ is the time the circuit operates in the resonant state.

B. Discontinuous State

During the discontinuous state, the series resonant circuit becomes an open circuit and the capacitor voltage remains constant while the inductor current is zero.

$$V_{cd}(t)|_{t=0} = V_c(t_z) \tag{11}$$

$$i_{Ld}(t) = 0 \tag{12}$$

Because the resonant state and the discontinuous state are repeated each half cycle (with only a polarity change), the relationship $V_c(0) = -V_c(T/2)$ must hold. Hence, the capacitor voltage and inductor current are given by, $$V_c(t) = \begin{cases} V_{cr}(t) & 0 \leq t < t_1 \\ V_{cd}(t) & t_1 \leq t < t_2 \\ -V_{cr}(t) & t_2 \leq t < t_3 \\ -V_{cd}(t) & t_3 \leq t < t_4 \end{cases} \tag{13}$$

$$i_L(t) = \begin{cases} i_{Lr}(t) & 0 \leq t < t_1 \\ i_{Ld}(t) & t_1 \leq t < t_2 \\ -i_{Lr}(t) & t_2 \leq t < t_3 \\ -i_{Ld}(t) & t_3 \leq t < t_4 \end{cases} \tag{14}$$

Fourier analysis can be performed on the inductor current waveform to compute the harmonics. The in-phase and quadrature components of both the fundamental and harmonics are given by:

$$I_{Lpn} = \frac{2\omega}{\pi}\int_0^{\pi/\omega} i_L(t)\cos(n\omega t)\,dt \tag{15}$$

$$I_{Lqn} = \frac{2\omega}{\pi}\int_0^{\pi/\omega} i_L(t)\sin(n\omega t)\,dt \tag{16}$$

It is important to determine the amount of power sourced from the primary IPT power supply for the pickup to operate. If harmonics are ignored, the real and reactive power sourced from the primary supply are given by:

$$P = \text{Re}(Z_r)I_1^2 \tag{17}$$

$$VAR = \text{Im}(Z_r)I_1^2 \tag{18}$$

where $$Z_r = \frac{-j\omega M^2}{L_2}\frac{I_{Lp1} + jI_{Lq1}}{I_{sc}} \tag{19}$$

C. Computation Routine

Figure 5:
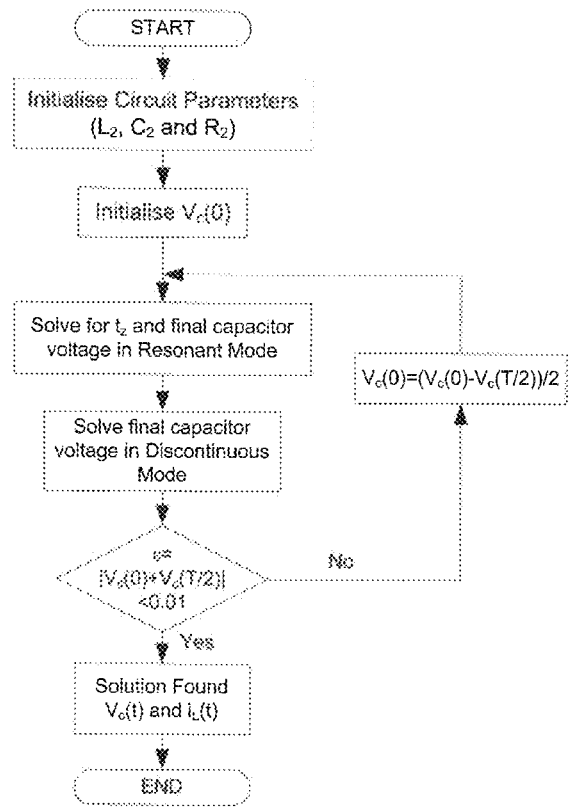
FIG. 5 is a flow chart of a computation algorithm.

The above analytical analysis is very difficult as the solution of $t_z$ and $V_c(0)$ are governed by (13) and (14) with $\theta_v$ and $\theta_i$ as interim variables which are associated with the auxiliary equations (7) and (9). This is in the form of transcendental equations that can only be solved using numeric solvers such as MATLAB or EXCEL. A computer program based on an iterative computation, shown in FIG. 5, has been developed in MATLAB to undertake the analysis. The program starts by initializing the circuit parameters such as $L_2$, $C_2$ and $R_2$. The initial capacitor voltage is set as an initial condition. With $V_c(0)$ known, $t_z$ can be calculated by solving (10). With $t_z$ known, the capacitor voltage at half a period can be calculated using (13). The next step is to check whether $V_c(0)$ and $-V_c(T/2)$ have converged to a given error index ($\varepsilon<0.01$). If the answer is YES, the program terminates when the correct solution is found. Otherwise the iteration repeats itself in the computation loop until a solution is found. The algorithm proves to be very fast and robust.

D. Rectifier Load Modelling

The series AC processing pickup can output a controlled DC voltage by adding a rectifier with a large DC filter capacitor. The output voltage is maintained at a DC level with the high frequency AC component removed. As a result, the AC voltage at the input of the rectifier becomes a rectangular waveform with an amplitude of the DC output voltage and two diode forward voltage drops from the rectifier. If only the fundamental component is modelled and the harmonic components are ignored, the RMS value of the rectangular voltage is given by:

$$V_{ac} = \frac{2\sqrt{2}(V_{dc} + 2V_f)}{\pi} \quad (20)$$

Assuming that $Q_2$ of the circuit is relatively high during normal operation, the input current to the rectifier can be approximated by half sinusoids with discontinuous sections in between. Then the RMS AC current is related to the rectified DC current by:

$$I_{ac} = \frac{\pi I_{dc}}{2\sqrt{2(1-2t_c/T)}} \quad (21)$$

Therefore the equivalent AC load is:

$$R_{ac} = \frac{8(1-2t_c/T)(R_{dc} + V_f/I_{dc})}{\pi^2} \quad (22)$$

The equivalent resistor can be used in (4) in the AC analysis described in the section above to compute the operating waveforms of the series AC processing pickup with a rectifier load.

Pickup Characteristics

Figure 6:
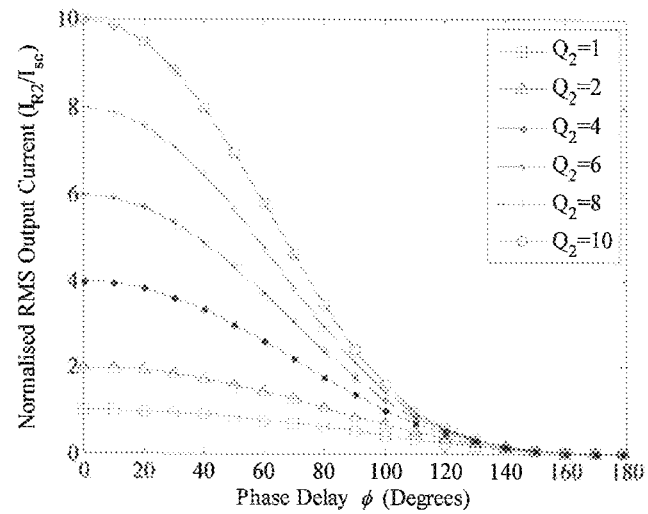
FIG. 6 is a diagram showing normalized RMS output current vs. phase delay $\phi$.

The output current (or inductor current) characteristics of the pickup are shown in FIG. 6 for different values of $Q_2$ or load conditions. The normalized output current is defined by the ratio of the output current over the short circuit current. It can be seen that the output current asymptotically decreases as the controlled phase delay ϕ increases from zero. The normalized output current can be controlled from the maximum value to zero as ϕ changes for all load ($Q_2$) conditions.

Figure 7:
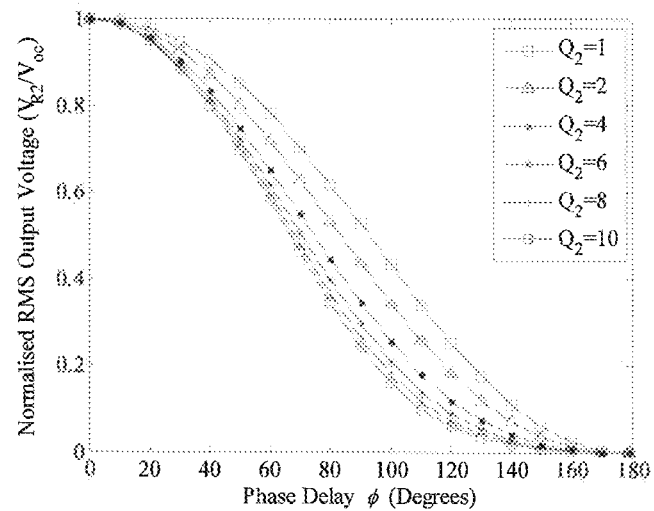
FIG. 7 is a diagram showing normalized RMS output voltage vs. controlled phase delay $\phi$.

The normalized output voltage is shown in FIG. 7 for a range of $Q_2$ values. It can be seen that the output voltage of the pickup can be controlled by ϕ as a controllable voltage source. FIG. 7 shows that the output voltage stays approximately constant (or has very little variation) as the load resistance changes for pickups with high $Q_2$ (5-10). Hence, this pickup demonstrates a controllable voltage source behaviour. For low $Q_2$ values, the voltage source is no longer considered perfectly sinusoidal as the harmonics contribute to the power transfer.

Figure 8:
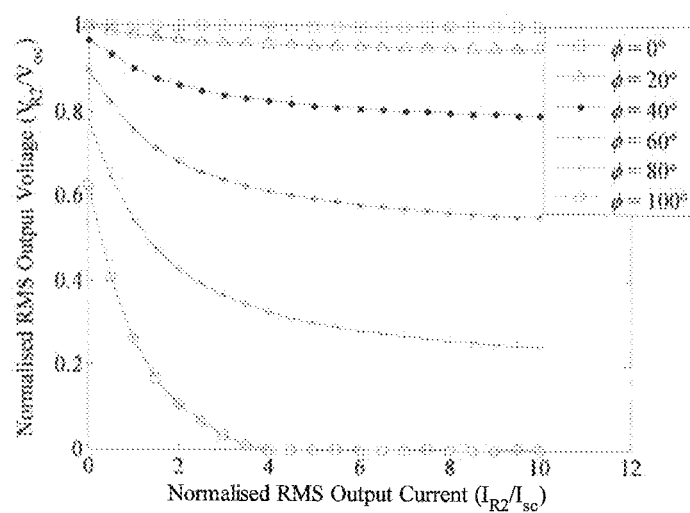
FIG. 8 shows pickup output voltage current characteristics.

The output voltage-current characteristic is shown in FIG. 8. The voltage source behaviour is again demonstrated as the output voltage stays approximately constant for a given phase delay irrespective of output current as long as the output current is reasonably high. It should be noted that this feature of the pickup will give rise to significant advantages to the overall system, as the output voltage can be controlled to any value below the open circuit voltage without the need of an extra buck converter after the pickup. Thus an output parameter such as voltage may be compared with a reference value and the switch may be operated to alter the period for which the inductor current is zero in a cycle and thus control the phase angle to move the output parameter toward the reference (i.e. to control the output of the pickup).

Figure 9:
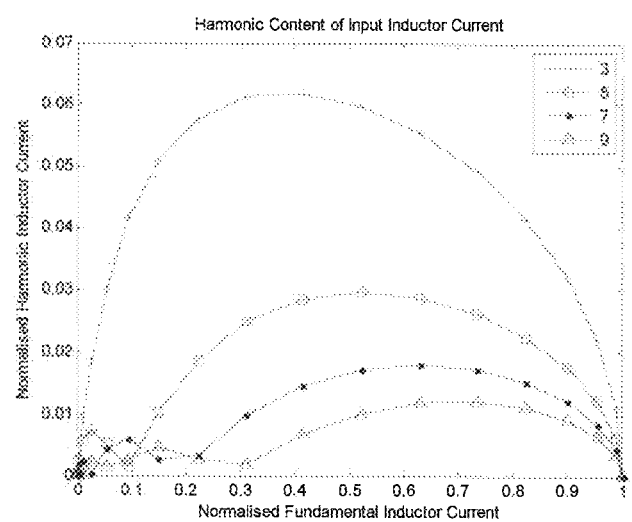
FIG. 9 shows harmonic components of inductor current as a percentage of the maximum fundamental value at $Q_2=5$.

FIG. 9 shows the first four harmonics of a series resonant circuit AC processing pickup operating at a $Q_2=5$ obtained from Fourier analysis. In these figures, the amplitude of the harmonics is expressed as a function of the fundamental component under full load conditions. It can be seen that the amplitudes of the harmonic components are relatively low compared to the fundamental. The highest harmonic component for the inductor current does not exceed 6.3% of the maximum fundamental component.

Figure 10:
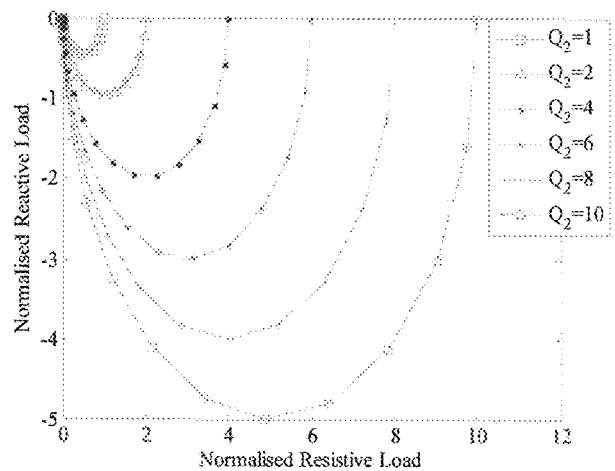
FIG. 10 shows reactive load vs. real load.

The normalized reflected impedance characteristic is shown in FIG. 10 at different values of $Q_2$. Both the resistive and reactive component is normalized against the factor $\omega M^2/L_2$. When the phase delay ϕ is at zero, only a resistive load is reflected back on the track and the real power is supplied by the power supply to drive the pickup. As the ϕ increases to decrease the output power, both a real load and a capacitive load is reflected, and the power supply has to source both the real power and the capacitive VAR's. When ϕ increases towards 180°, both the reactive and resistive load decrease to zero. Even if the pickup reflects relatively large VAR's at lower power, the primary power supply is not necessarily overstressed as the overall VA has decreased significantly compared with rated operation.

Design

Figure 11:
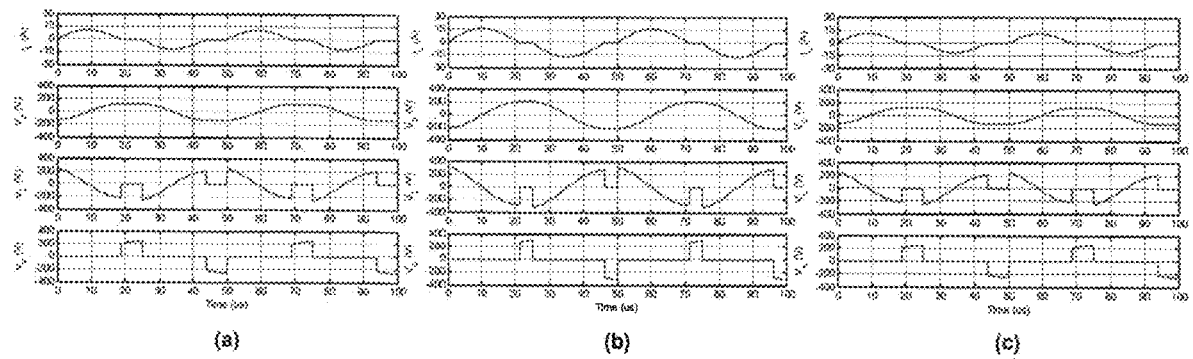
FIG. 11 shows calculated waveforms when phase delay $\phi$ is (a) 0°, (b) 58° and (c) 85°.

In this section, the design of a 1.2 kW series AC processing pickup according to the circuit of FIG. 2 is described. The maximum desired output voltage is 90V and the AC load resistance is 6Ω. An asymmetrical S-shaped magnetic inductor was chosen in this example because of its higher output power with the same ferrite volume/length compared to traditional magnetic pickup structures. This pickup has a $V_{oc}$ of 90V and an inductance value of 115 µH. The primary IPT converter uses an LCL topology operating at a fixed frequency of 20 kHz with 125 A in the primary track. From (1), the nominal tuning capacitance is 551 nF. In this example, the tuning capacitance is chosen to closely match the ideal nominal tuning capacitance. Using (4), $Q_2$ of the circuit is 2.4 at maximum power. Equations (13) and (14) are then used to solve for steady state operation. FIG. 11 shows the calculated waveforms for the circuit with a phase delay $\phi$ of 0°, 58° and 85° which correspond to 100%, 50% and 20% power, respectively.

A. Implementation of the AC Switch

Figure 12:
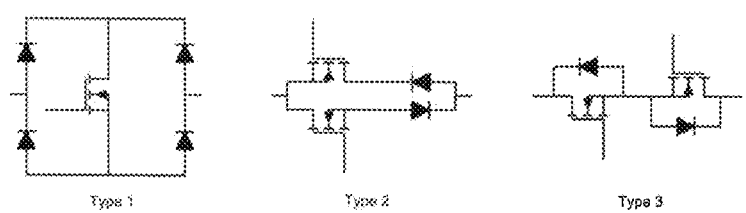
FIG. 12 shows examples of bi-directional switches.

The AC switch, shown in the embodiment of FIG. 2, has to conduct current and block voltage in both directions, i.e. be a bi-directional switch. FIG. 12 shows three possible ways of forming the AC switch using available IGBT's or MOSFET's. Type 1 of the bi-directional switches is not ideal for the series AC pickup as the pickup is primarily used in low voltage high current applications and the forward voltage drop of two diodes compared to one diode drop in other configurations is less efficient. In the type 2 configuration, the current path flows in either direction taking the top or bottom path. One of the switches in this set of devices has to have an isolated gate drive. The type 3 configuration has advantages of common ground between the transistors, so it is easier to drive the gate. In addition, the body diode of the switching device can be used without the need for external diodes, provided those diodes are sufficiently low loss.

One key requirement of practically realizing the AC switch is to allow the switches to operate on simple gate drive waveforms. In the description of circuit operation provided with respect to FIGS. 2 and 3, a very precisely timed gate drive waveform at 40 kHz is required to drive the gate. However, in practice it is too difficult to generate this waveform with sufficient accuracy using presently available microcontrollers. Any error in timing forces the circuit into a discontinuous state when the inductor current is non zero and the resulting overshoot in voltage across the switches may cause device failure. In consequence, it is more desirable to use the diodes turn-off behaviour to block the current in the reverse direction and allow the circuit to naturally enter the discontinuous state due to diode commutation. Hence, the PWM gate signals are only required to be operating at 50% duty cycle with a phase delay $\phi$ relative to the phase of $V_{oc}$ to allow the circuit to enter the resonant state, while the natural diode turn off characteristic allows the circuit to enter the discontinuous state. Thus the switch can be operated such that the natural turn off characteristic of a diode associated with the switch allows the current to fall to substantially zero. If the diode was to ideally turn off at zero current, a reverse recovery charge of zero is required. However, a diode with a reverse recovery charge of zero does not exist in practice so that a suitable switch that has a diode with a low reverse recovery charge is chosen. Here the type 3 AC switch configuration from FIG. 12 was chosen, with IGBT's (IRGP20B60PDPbF) rather than MOSFET's as the switch because this IGBT has a body diode with a low reverse recovery charge of 80 nC.

B. Snubber Design

A simple RC snubber was designed to damp the high frequency resonant oscillations caused by the pickup inductance and parasitic output capacitance of the IGBT. This is required because although an IGBT with low reverse recovery charge was chosen to reduce the transient generated from the natural turn off of the body diode, when the current tries to flow in the opposite direction, the remaining voltage oscillation is still significant. This oscillation arises because the reverse recovery current of 3 A becomes the initial inductor current of an LC resonant circuit comprising the pickup inductance of 115 uH and the switch output capacitance of 130 pF. A large over shoot of more than 80% of the steady state value appears across the switch due to the resulting resonant oscillations. A snubber capacitance of 2.2 nF was connected across each switch in the usual manner.

C. Component Stress

To calculate the maximum rating conditions for the components, the phase delay $\phi$ has to be set slightly above zero degrees in order to observe the peak voltage across the switches and maximum RMS rating for the capacitor and inductor. The calculated peak and RMS value of the voltage and current for the capacitor, inductor and switch are listed in Table I. It can be concluded from Table I that the switches have to be rated for both 310V and 22 A at normal operation. However, an overshoot of 10% is still possible from the snubber design, so the switch rating should be greater than 350V. In practice a 500V device may be used.

TABLE I

Maximum Ratings of Components

| Parameter | Peak | RMS |
| --- | --- | --- |
| $V_c$ | 307 V | 217 V |
| $V_L$ | 309 V | 218 V |
| $V_s$ | 309 V | — |
| $I_L$ | 21.2 A | 15 A |
| $I_s$ | 21.2 A | 15 A |

D. Controller

Figure 13:
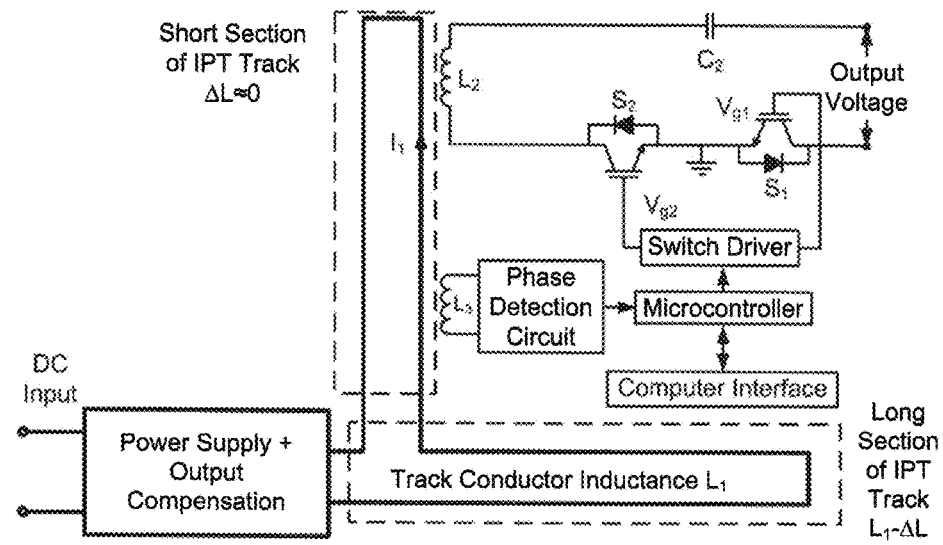
FIG. 13 is a block diagram for a controller.

A practical system setup with controller for the AC processing pickup is shown as a block diagram in FIG. 13. The phase of $V_{oc}$ is measured using a separate phase sense coil $L_3$ placed on the primary track to detect the phase of the track current which is exactly 90° out of phase with the open circuit voltage ($V_{oc} \propto I_1 \angle 90°$). The phase delay $\phi$ is set by a computer interface while a microcontroller adjusts the switch gate drive waveforms accordingly. The two gate control waveforms are driven at 50% duty cycle at the same frequency but having a phase delay of $\phi$ relative to the phase of the IPT track current. One of the gate drive signals is the inverted version of the other.

Experimental Results

Figure 14:
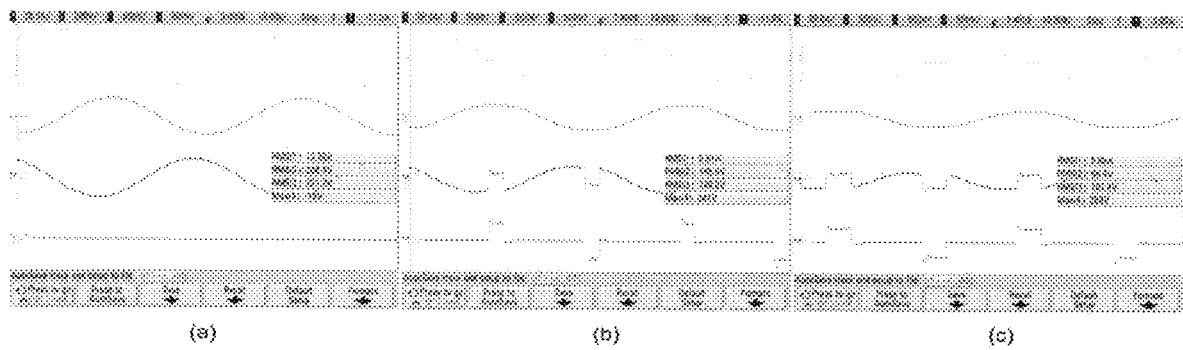
FIG. 14 shows measured waveforms for (a) 100% power, (b) 50% power and (c) 20% power with 6Ω resistive load.

The AC processing pickup as described above was coupled to a small section of track (FIG. 13) and used to drive 1.2 kW into a 6Ω AC resistor. FIG. 14 shows the circuit waveforms for the series AC processing pickup at 100%, 50% and 20% power when $\phi$ is set to 0°, 58°, and 85°, respectively. From the top trace to the bottom trace, in descending order, the traces are the capacitor voltage, inductor current, capacitor current and switch current. The inductor current and capacitor voltage are both sinusoidal having low distortion at 100% power. The measurements as shown have excellent correlation with the calculated waveforms in FIG. 11. The amplitudes of the measured waveforms are within 10% of the values calculated by equations (13) and (14).

Figure 15:
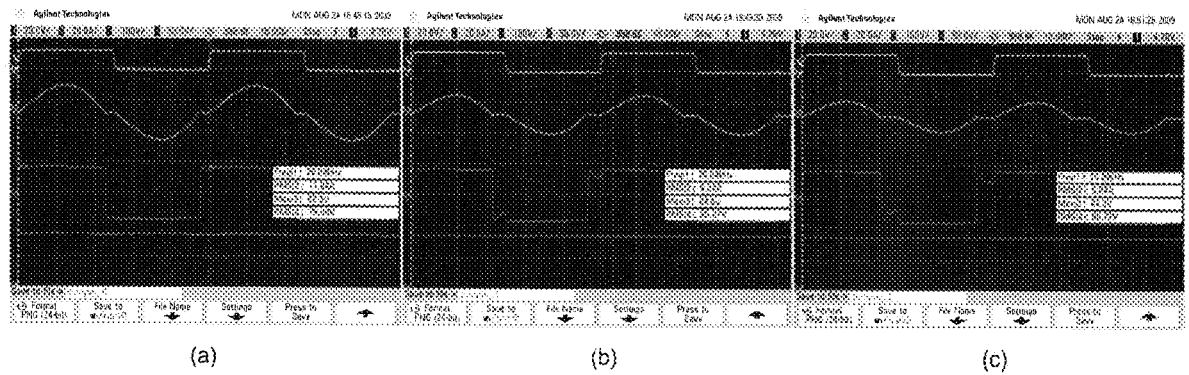
FIG. 15 shows measured waveforms for (a) 8Ω, (b) 12Ω and (c) 16Ω load with constant 80V DC voltage.

A rectifier and a 2 mF filter capacitor are added at the output of the pickup to output a controlled DC voltage. The pickup is operated with a closed-loop controller where the output voltage is set to a desired value in the microcontroller. The microcontroller is configured to maintain the desired load voltage by adjusting $\phi$ in accordance to the feedback of the output voltage. FIG. 15 shows the circuit waveforms when the output voltage is regulated to a DC voltage of 80V for 8Ω, 12Ω and 16Ω load, respectively. From top trace to bottom, in descending order, the traces are the gate drive waveform $V_{g1}$ (FIG. 13), the inductor current, the input voltage to the rectifier and the DC output voltage. It can be see that the output voltage is nearly constant with an error of less than 1% around the desired value. The maximum voltage that appears across the switch is 340V operating with the rectifier. This is in conformance with the results deduced in the previous section.

Figure 16:
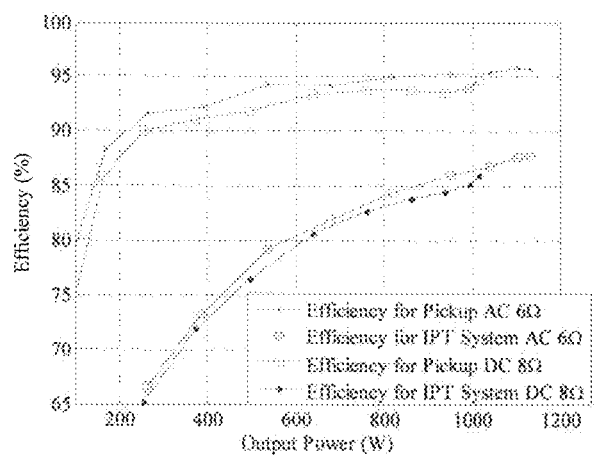
FIG. 16 shows efficiency vs. output power.

An efficiency vs. output power plot is shown in FIG. 16 for the overall IPT system and the series AC processing pickup by itself outputting controlled AC to a 6Ω load. In addition, the efficiency of the overall system and the AC processing pickup with rectifier when outputting controlled DC to an 8Ω load is also plotted. Referring to FIG. 13, the overall IPT system efficiency is determined using measures of the DC input power to the LCL primary converter and the AC output power from the secondary pickup. Similarly, the pickup efficiency is calculated using the AC input power delivered to a short length of primary track that the secondary pickup is coupled upon and the AC output power from the secondary pickup. The pickup efficiency measurement neglects the supply (LCL converter) power losses and gives a more meaningful measure of the conversion efficiency of the pickup itself. The DC efficiency is measured with the losses in the rectifier taken into account. It can be seen that the efficiency of the pickup remains above 90% when the output power is more than 300 W to the load for either a DC or AC load. With a 1.2 kW load, the efficiency of the AC processing pickup and the overall IPT system can reach as high as 96% and 89%, respectively when outputting controlled AC.

This document discloses a new IPT pickup having a series resonant circuit in which power is processed on a cycle by cycle basis in AC (i.e. without rectification being necessary) and which can produce a variable AC output voltage into a load or a rectifier filter and load combination for controlled DC. This eliminates the bulky DC inductor required in the traditional series tuned controllers that use a buck converter to produce a DC controlled output. In addition, the pickup operates under near ideal soft switching conditions which give the pickup a very high efficiency. Although this pickup reflects back VAR's back onto the primary track, the overall stress imposed on the primary power supply is relatively small. The circuit operation has been theoretically analyzed and experimental results have verified the proposed design procedure. The AC processing pickup can be controlled over a wide load range for a 1.2 kW system and a maximum efficiency of 96% was obtained.

Although certain examples and embodiments have been disclosed herein it will be understood that various modifications and additions that are within the scope and spirit of the invention will occur to those skilled in the art to which the invention relates. All such modifications and additions are intended to be included in the scope of the invention as if described specifically herein.

The invention claimed is:

1. A method of providing an AC supply from an IPT pickup having a pickup coil and a tuning capacitor connected in series to provide a series resonant circuit, the method comprising varying a phase angle between an open circuit pickup coil voltage and a pickup coil inductor current to provide a controlled AC supply to an output of the pickup.

2. A method as claimed in claim 1 wherein the phase angle between the open circuit pickup coil voltage and the pickup coil inductor current is varied by substantially preventing current flow in the resonant circuit for a selected time period.

3. A method as claimed in claim 2 further comprising varying the selected time period to vary the phase angle.

4. A method as claimed in claim 2 wherein substantially preventing current flow comprises detecting when the current in the resonant circuit is substantially zero and maintaining the current at substantially zero for the selected time period.

5. A method as claimed in claim 2 further comprising operating a switch in order to substantially prevent current flow in the resonant circuit.

6. A method as claimed in claim 5 further comprising of using a bi-directional switch.

7. A method as claimed in claim 5 wherein operating the switch comprises allowing current flow through the switch to become substantially zero by a diode turn off characteristic.

8. A method as claimed in claim 2, further comprising comparing the output of the pickup with a reference, and increasing or decreasing the selected time period to change the output of the pickup toward the reference.

9. An IPT pickup comprising a pickup coil and a tuning capacitor connected in series to provide a series resonant circuit, and a controller to vary a phase angle between a pickup coil open circuit voltage and a pickup coil inductor current to thereby provide a controlled AC supply to an output of the pickup.

10. An IPT pickup as claimed in claim 9 wherein the phase angle between the pickup coil open circuit voltage and the pickup coil inductor current is varied by the controller substantially preventing current flow in the resonant circuit for a selected time period.

11. An IPT pickup as claimed in claim 10 wherein the controller varies the selected time period to vary the phase angle.

12. An IPT pickup as claimed in claim 10 wherein the controller substantially prevents current flow by detecting when the current in the resonant circuit is substantially zero and maintaining the current at substantially zero for the selected time period.

13. An IPT pickup as claimed in claim 10 wherein the resonant circuit comprises a switch, and the controller is configured to operate the switch in order to substantially prevent current flow in the pickup coil.

14. An IPT pickup as claimed in claim 13 wherein the switch comprises a bi-directional switch.

15. An IPT pickup as claimed in claim 13 wherein the controller operates the switch by allowing current flow through the switch to become substantially zero by a diode turn off characteristic.

16. An IPT pickup as claimed in claim 10 wherein the controller compares the output of the pickup with a reference, and increases or decreases the selected time period to change the output of the pickup toward the reference.

17. An IPT pickup as claimed in claim 9 further comprising a switch connected in series with the series resonant circuit wherein the controller operates the switch to provide the controlled AC supply to the output of the pickup.

18. An IPT pickup as claimed in claim 17 wherein the switch comprises a bi-directional switch.

19. A method as claimed in claim 1 further comprising open-circuiting the resonant circuit to substantially prevent current flow in the pickup coil.

20. A method of controlling a series tuned pickup comprising open-circuiting a resonating circuit of the series tuned pickup that comprises a pickup coil for a portion of a resonant cycle to create a phase shift between an open circuit voltage in the pickup coil and a current in the circuit.

21. The method of claim 20, wherein the method comprises controlling a duration of each resonant cycle that the series tuned pickup is open-circuited to regulate an output voltage of the series tuned pickup.

22. The method of claim 20, wherein the method comprises controlling a switching duty cycle to regulate an AC output of the series tuned pickup.

* * * * *